（12) United States Patent
Cox et al.

(10) Patent No.: US 8,704,833 B2
(45) Date of Patent: Apr. 22, 2014

(54) METHOD AND APPARATUS FOR DISPLAYING A VIDEO SIGNAL ON A COMPUTER SYSTEM

(75) Inventors: David R. Cox, Los Gatos, CA (US); Derek J. DiCarlo, Mountain View, CA (US); Paul J. Costa, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1265 days.

(21) Appl. No.: 11/810,487

(22) Filed: Jun. 6, 2007

(65) Prior Publication Data

US 2008/0303946 A1    Dec. 11, 2008

(51) Int. Cl.
*G06F 15/00* (2006.01)
(52) U.S. Cl.
USPC ............................ 345/501; 345/530; 386/200
(58) Field of Classification Search
USPC ............................... 386/46; 345/520; 382/299
See application file for complete search history.

(56) References Cited

U.S. PATENT DOCUMENTS

| | | | |
|---|---|---|---|
| 2003/0016824 A1* | 1/2003 | Epstein | 380/203 |
| 2006/0020790 A1* | 1/2006 | Sprunk | 713/167 |
| 2006/0171659 A1* | 8/2006 | Worrell et al. | 386/46 |
| 2006/0222022 A1* | 10/2006 | Shintani et al. | 370/537 |
| 2006/0228048 A1* | 10/2006 | Forlines | 382/299 |
| 2007/0157046 A1* | 7/2007 | Samson et al. | 713/323 |
| 2007/0176936 A1* | 8/2007 | Cho | 345/520 |
| 2008/0005421 A1* | 1/2008 | Chang et al. | 710/62 |
| 2008/0094413 A1* | 4/2008 | Autor et al. | 345/629 |

* cited by examiner

*Primary Examiner* — Phi Hoang
(74) *Attorney, Agent, or Firm* — Fletcher Yoder PC

(57) ABSTRACT

A system that displays a video signal on a display for a computer system is presented. During operation, the system receives a signal to switch from displaying a video signal from an internal video source to displaying a video signal from an external video source. In this system, the internal and external video sources are coupled to a bi-directional video port for the computer system, wherein the internal video source generates an output video signal and the external video source generates an input video signal. The system then determines whether the external video source is coupled to the bi-directional video port. If so, the system couples the external video source to the display and determines whether the external video source is a valid video source. If the external video source is a valid video source, the system displays the video signal from the external video source on the display.

36 Claims, 8 Drawing Sheets

METHOD AND APPARATUS FOR DISPLAYING A VIDEO SIGNAL ON A COMPUTER SYSTEM

BACKGROUND

1. Field of the Invention

The present invention relates to techniques for displaying a video signal. More specifically, the present invention relates to a method and apparatus for selecting between an internal video source and an external video source to be displayed on a computer system.

2. Related Art

A typical computer system generates an output video signal which is outputted through a display which is coupled to the computer system. However, in order to display a video signal from an external video source, the computer system requires special hardware. For example, the special hardware can include a graphics card which has a video input port (in addition to a standard video output port).

For computer systems with integrated displays (e.g., "all-in-one" computer systems), a video source generated within the computer system is typically the only video source that can be displayed on the computer system. There is presently no way to display the external video signal on the display for an all-in-one computer system without adding video capture hardware to the all-in-one computer system.

Hence, what is needed is a method and an apparatus for displaying an external video signal on a display for an all-in-one computer system without the problems described above.

SUMMARY

One embodiment of the present invention provides a system that displays a video signal on a display for a computer system. During operation, the system receives a signal to switch from displaying a video signal from an internal video source to displaying a video signal from an external video source. In this system, the internal video source and the external video source are coupled to a bi-directional video port for the computer system, wherein the internal video source generates an output video signal for the bi-directional port, and wherein the external video source generates an input video signal for the bi-directional port. The system then determines whether the external video source is coupled to the bidirectional video port. If so, the system couples the external video source to the display and determines whether the external video source is a valid video source. If the external video source is a valid video source, the system displays the video signal from the external video source on the display. Note that the internal video source is a video source which is generated by the computer system. Also note that the external video source is a video source which may or may not be coupled to the computer system. In one embodiment, the bi-directional video port is the same video port that is typically used as an output-only video port.

In one embodiment, while determining whether the external video source is coupled to the bi-directional video port, the system deasserts a video source indicator signal which is asserted by the internal video source on a video source indicator pin of the bi-directional video port. For this embodiment, the video source indicator signal for the internal video source and the video source indicator signal for the external video source are asserted on the same video source indicator pin of the bi-directional video port. The system then determines whether the video signal indicator signal is asserted on the video source indicator pin of the bi-directional video port.

If so, the system determines that the external video source is coupled to the bi-directional video port. Otherwise, the system determines that the external video source is not coupled to the bi-directional video port.

In one embodiment, the video source indicator pin can include a power supply pin for a Digital Data Channel (DDC) interface.

In one embodiment, a first switch is configured to couple: (1) the internal video source to the bi-directional video port; or (2) the external video source, which is coupled to the bi-directional video port, to the display.

In one embodiment, while coupling the external video source to the display, the system switches the first switch so that the external video source is coupled to the display.

In one embodiment, a second switch is configured to couple: (1) the internal video source to the display; or (2) the external video source, which is coupled through the first switch, to the display.

In one embodiment, while displaying the external video source on the display, the system switches the second switch so that the external video source is coupled to the display.

In one embodiment, when a signal to switch from displaying the external video source on the display to displaying the internal video source on the display is received, the system asserts the video source indicator signal for the internal video source on the video source indicator pin of the bi-directional video port. The system then switches the second switch so that the internal video source is coupled to the display.

In one embodiment, the signal to switch from displaying the external video source on the display to displaying the internal video source on the display can include, but is not limited to: a system wake event for the computer system; a switch signal toggled from a button on the computer system; or a switch signal activated from a user interface of the computer system.

In one embodiment, the signal to switch from displaying the internal video source on the display to displaying the external video source on the display can include, but is not limited to: a switch signal toggled from a button on the computer system; or a switch signal activated from a user interface of the computer system.

In one embodiment, the computer system can include an "all-in-one" computer system which includes an integrated display.

In one embodiment, the bi-directional video port can include, but is not limited to: a Digital Video Interface (DVI) port; a mini-DVI port; a universal display interface (UDI) port; a video graphics array (VGA) port, a mini-VGA port; a digital flat panel (DFP) port; a DisplayPort port; a High-Definition Multimedia Interface (HDMI) port; and other video ports now known or later developed.

In one embodiment, if the external video source is not coupled to the bi-directional video port, the system couples the internal video source to the display.

In one embodiment, if the external video source is not a valid video source, the system displays the internal video source on the display.

In one embodiment, an invalid external video source can include: an external video source which is not coupled to the bi-directional video port; an external video source which is in a display-sleep mode; an external video source which is powered-down; and an external video source which uses a protocol that is not supported by the display.

In one embodiment, if the computer system is turned off and the external video source is coupled to the bi-directional video port, the system activates only specified components within the computer system which are used to display the external video source, wherein other components within the computer system remain turned off. Next, the system couples the external video source to the display. The system then determines whether the external video source is a valid video source. If so, the system displays the external video source on the display.

In one embodiment, the specified components can include: the display; control circuits and processing circuits for displaying the external video source on the display; cooling fans to cool the display; one or more power supplies; and cooling fans to cool the control circuits and the processing circuits.

In one embodiment, prior to displaying the external video source on the display, the system scales a video signal generated by the external video source so that the video signal can be displayed on the display.

Figure 1:
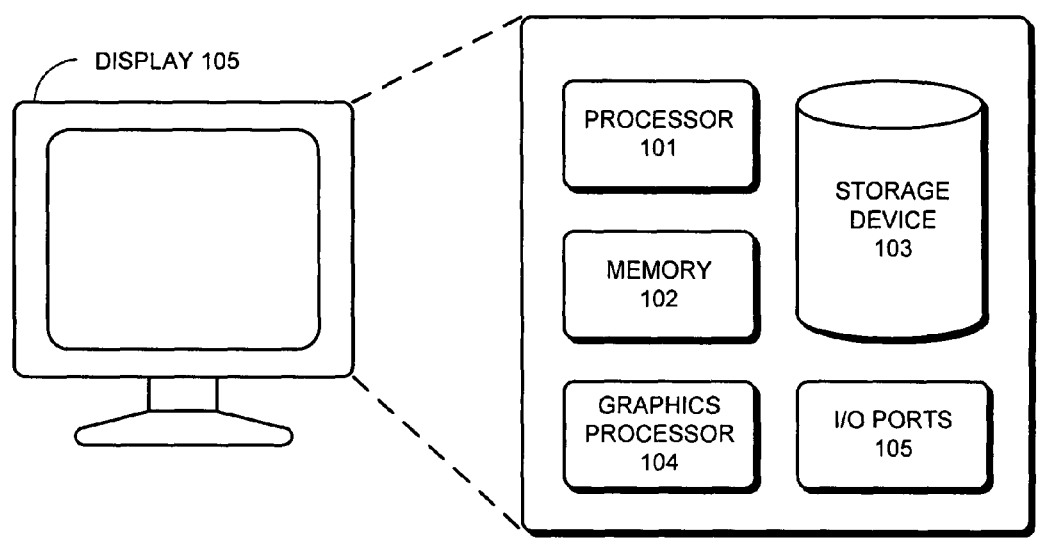
FIG. 1 presents a block diagram of an all-in-one computer system in accordance with an embodiment of the present invention.

Table 1 presents a number of settings for an all-in-one computer system which is in state S5 in accordance with an embodiment of the present invention.

Table 2 presents a number of settings for an all-in-one computer system which is in state S5i3D in accordance with an embodiment of the present invention.

Table 3 presents a number of settings for an all-in-one computer system which is in state S5i0D in accordance with an embodiment of the present invention.

Table 4 presents a number of settings for an all-in-one computer system which is in state S0 in accordance with an embodiment of the present invention.

Table 5 presents a number of settings for an all-in-one computer system which is in state S0i3D in accordance with an embodiment of the present invention.

Table 6 presents a number of settings for an all-in-one computer system which is in state S0i0D in accordance with an embodiment of the present invention.

Table 7 presents a number of settings for an all-in-one computer system which is in state S0i0M in accordance with an embodiment of the present invention.

Table 8 presents a number of settings for an all-in-one computer system which is in state S3i3D in accordance with an embodiment of the present invention.

Table 9 presents a number of settings for an all-in-one computer system which is in state S3i0D in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Several techniques can be used to implement a video input feature for an all-in-one computer system. Note that for the sake of clarity, the present invention is described in terms of a computer system. However, the present invention can be applied to any computer system, including but not limited to: an all-in-one computer system; a music player with an integrated display; a personal digital assistant (PDA); a laptop computer; a hand-held gaming console; and any other electronic device with an integrated display and/or video input/output ports now known or later developed. Also note that for the sake of clarity, the present invention is described in terms of a Digital Video Interface (DVI) monitor. However, the present invention can be applied to any video interface standard now known or later developed. For example, the video interface standard can include, but is not limited to: a DVI interface; a mini-DVI interface; a universal display interface (UDI) interface; a video graphics array (VGA) interface, a mini-VGA interface; a digital flat panel (DFP) interface; a DisplayPort interface; a High-Definition Multimedia Interface (HDMI); and other video interfaces now known or later developed One technique uses a video input and capture technique, wherein a video signal is decoded, captured and recorded. Alternatively, the video signal can be decoded, captured, and displayed on the display for the all-in-one-computer system. Note that the video signal may need to be converted to a format that the computer system can understand prior to displaying the video signal on the display.

Another technique provides a DVI/HDMI (High-Definition Multimedia Interface) digital video capture technique. In this technique, decoded and uncompressed digital display data is received and captured. Note that this technique is typically suited for high-end professional users.

One embodiment of the present invention uses the display of an all-in-one computer system as if it were a standalone DVI monitor. In this embodiment, a user can switch between an internal video signal and external video signal. In this embodiment, the all-in-one computer system acts purely as a monitor, presenting the video in full-screen mode without substantial additional latency and without capturing any data.

In one embodiment of the present invention, an external video source can include, but is not limited to, a laptop, a computer system, a gaming console, and a set-top box.

One embodiment of the present invention uses a bi-directional video port to support a video input mechanism. In one embodiment, the bi-directional video port is a video port on the all-in-one computer system which is typically used as an output video port. For example, on the iMac® from Apple Inc., the secondary display output is a mini-Digital Visual Interface (mini-DVI) port which is used to output video signals generated by an video source within the iMac. (Note that iMac is a trademark of Apple Inc., registered in the U.S. and other countries.) In one embodiment, the video port can be used both as an input and an output video port without any modifications to the video port itself.

In one embodiment of the present invention, the bi-directional video port is a Digital Visual Interface (DVI) port. In another embodiment of the present invention, the bi-directional video port is a mini-DVI port. In other embodiments, the bi-directional video port can include, but is not limited to: a universal display interface (UDI) port; a video graphics array (VGA) port, a mini-VGA port; a digital flat panel (DFP) port; a DisplayPort port; a High-Definition Multimedia Interface (HDMI) port; and other video ports now known or later developed In one embodiment of the present invention, a single-channel DVI interface is used. In another embodiment of the present invention, a dual-channel DVI interface is used.

In one embodiment, the bi-directional video port is coupled to an internal video source. In another embodiment, the bi-directional video port is coupled to an external video source. In one embodiment, a user can select whether to display the internal video source or the external video source. Similarly, in one embodiment, the user can select the internal video source to be output on the bi-directional video port.

In one embodiment of the present invention, an external video signal is scaled prior to displaying the external video signal on the display for the all-in-one computer system. In another embodiment of the present invention, the external video signal is not scaled prior to display the external video signal on the display for the all-in-one computer system. In this embodiment, if a device coupled to the all-in-one computer system cannot source or scale an appropriate resolution for the display, the video signal may not fill the entire screen. For example, set-top boxes usually output fixed resolutions and do not contain scalers (they rely on the TV for that functionality). Similarly, a Digital Video Recorder (DVR) that outputs 720p HDTV is likely to have a black border around the entire video.

In one embodiment of the present invention, a typical use case can be:

1. User boots the all-in-one computer system normally.
2. Whenever a second output display is not coupled to the bi-directional video port, the user is presented with an interface feature such as a "switch" to an external video source. For example, the switch can include a keyboard shortcut, mouse pointer location, shortcut icon, preference button, etc. In one embodiment, the switch can include a button in user interface features or a physical button.
3. User connects and turns on external video source.
4. User activates the switch function.
5. If the all-in-one computer system determines a valid external video source is coupled to the system. In this case, the external video source is displayed.
6. While in external video source mode, brightness adjustment keys (if they are present in the computer system) continue to function as usual. Also, the system sleep timer can be disabled.
7. Any other user input (e.g., a different keyboard press, mouse click, remote control press) wakes the system and switches back into normal mode wherein the internal video signal is displayed.

In one embodiment of the present invention, if the external video source goes into a display-sleep mode and the user is currently viewing the external video source, the display for the all-in-one computer system goes black. In one embodiment, from this state, a system wake event causes the internal video source to be displayed on the display. In another embodiment, from this state, a wake event from the external video source relights the screen with the external video source as the active video source.

In one embodiment of the present invention, if the user requests a switch to an external video source, but there is no valid signal (source not connected, in display sleep, or not a DVI source), the display does not switch over to displaying the external video source.

In one embodiment of the present invention, if the user disconnects the external video source, the display goes back into a normal mode, wherein the internal video source is displayed.

In one embodiment of the present invention, an LED is used to indicate external source display sleep states. In another embodiment, an icon is used to indicate external source display sleep states. For example, the icon can change shapes to indicate the active direction of video data being displayed on the display for the computer system. Note that other indicators can be used to indicate the state of the internal video source and/or the external video source.

In one embodiment of the present invention, an external video source can be displayed on the display for an all-in-one computer system when the all-in-one computer system is turned off or is in a system sleep state. For example, a user can plug a laptop into a powered-down all-in-one computer system, and only the display and components required to operate the display for the all-in-one computer system are powered-on. Note that a similar scenario can be supported in system sleep state.

In one embodiment of the present invention, if the all-in-one computer system is turned off, specified cooling fans for the all-in-one computer system are powered-on to cool components within the all-in-one computer system used to display the external video source.

All-In-One Computer System

FIG. 1 presents a block diagram of an all-in-one computer system 100 in accordance with an embodiment of the present invention. In one embodiment, all-in-one computer system 100 can include an iMac® computer system. All-in-one computer system 100 includes, but is not limited to, processor 101, memory 102, storage device 103, graphics processor 104, and I/O ports 105.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, read only memory (ROM), and any other type of memory now known or later developed. Storage device 103 can include any type of non-volatile storage device that can be coupled to a computer system. This includes, but is not limited to, magnetic, optical, and magneto-optical storage devices, as well as storage devices based on flash memory and/or battery-backed up memory. Graphics processor 104 can include any dedicated processor which performs graphics operations on pixels. For example, graphics processor 104 can include, but is not limited to a graphics processing unit (GPU). I/O ports 105 can include one or more I/O ports, wherein each port can include, but is not limited to, a serial port, a parallel port, a PS/2 port, a Universal Serial Bus (USB) port, a VGA port, a Digital Visual Interface (DVI) port, a mini-DVI port, an High-Definition Multimedia Interface (HDMI), a DisplayPort port, an Ethernet port, a modem port, or any other I/O port now known or later developed.

In one embodiment of the present invention, computer system 100 includes an integrated display 105. In one embodiment, display 105 can display video signals generated by graphics processor 104. In another embodiment, display 105 can display video signals generated by an external video source, which is coupled to all-in-one computer system 100 through an I/O port within I/O ports 105. In another embodiment, display 105 can display either a video signal generated by graphics processor 104 or a video signal generated by an external video source.

Figure 2:
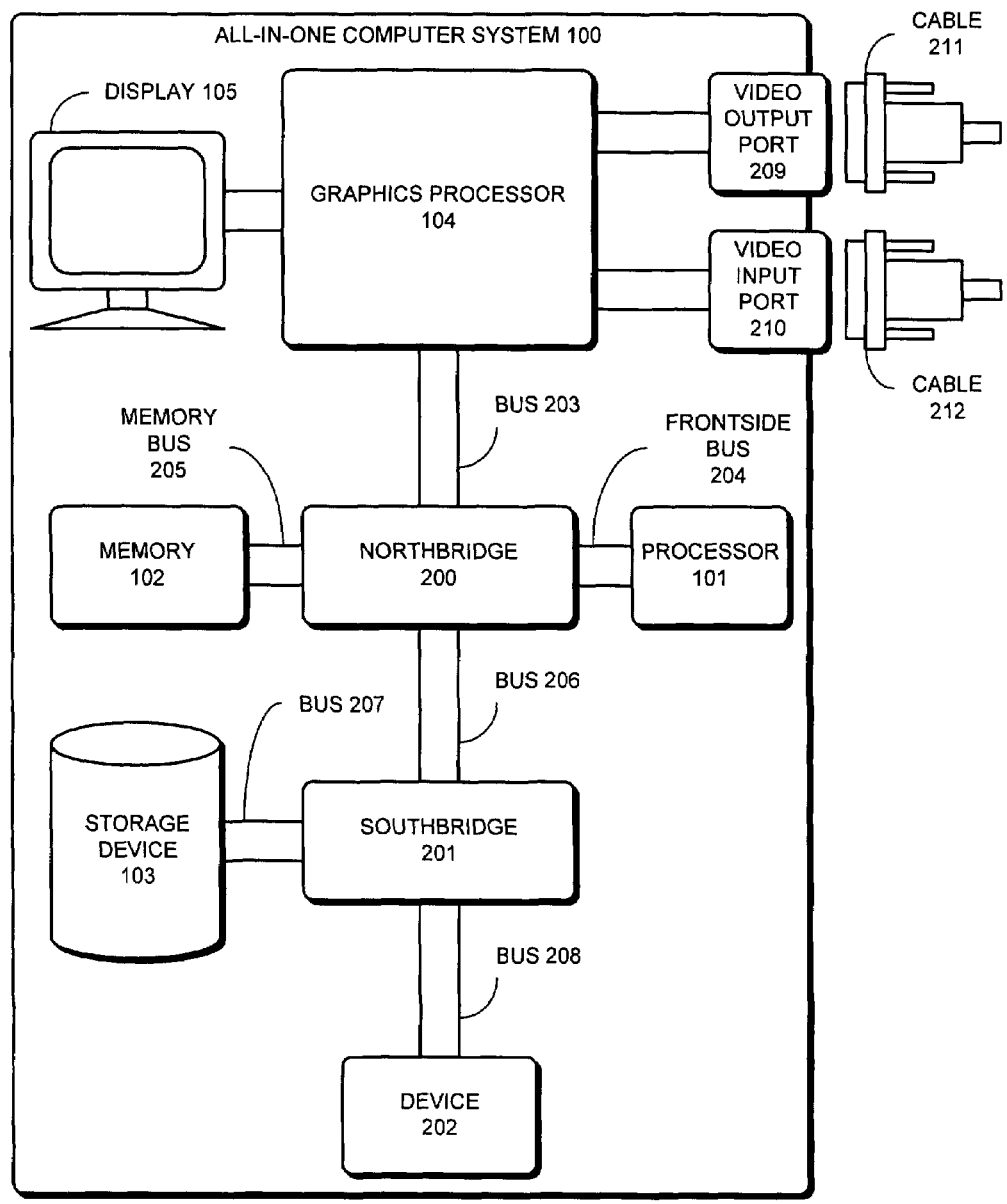
FIG. 2 presents a block diagram of the components within an all-in-one computer system in accordance with an embodiment of the present invention.

FIG. 2 presents an exemplary block diagram of the components within all-in-one computer system 100 in accordance with an embodiment of the present invention. Note that the components illustrated in FIG. 2 are not meant to limit the scope of present invention. The present invention can be applied to a computer system which has system architecture different than the one illustrated in FIG. 2. For example, the components can be substituted for other components, the components can be omitted, one or more components can be combined into a single component, and/or the system architecture can be different than the architecture illustrated in FIG. 2. Within FIG. 2, graphics processor 104 is coupled to display 105, video output port 209, and video input port 210. Note that graphics processor 104 can be coupled to more than one video input port and more than one video output port. Video cables 211 and 212 are coupled to video output port 209 and video input port 210, respectively.

In one embodiment, graphics processor 104 generates video signals which are transmitted to cable 211 through video output port 209. In this embodiment, graphics processor 104 can: (1) simultaneously transmit signals to display 105 and video output port 209; (2) transmit signals to display 105 only; or (3) can transmit signals to video output port 209 only.

In another embodiment of the present invention, graphics processor 104 receives video signals generated by an external video source that are transmitted through cable 212, which is coupled to video input port 210. In this embodiment, graphics processor 104 receives the external video signal and transmits the external video signal to display 105. Similarly, graphics processor 104 can perform graphics operations on the video signal received from the external video source (e.g., video capture) and send the processed video signal to display 105 or to another component within all-in-one computer system 100.

In one embodiment of the present invention, video input port 210 is not present in all-in-one computer system 100. In this embodiment, all-in-one computer system 100 can only display internally-generated video signals on display 105. Furthermore, all-in-one computer system 100 can generate an output video signal on video output port 209.

In one embodiment of the present invention, graphics processor 104 is also coupled to northbridge 200 through bus 203. In one embodiment of the present invention, bus 203 can include, but is not limited to: an Accelerated Graphics Port (AGP) bus; and a PCI Express bus. Note that northbridge 200 is coupled to memory 102 through memory bus 205 and is coupled to processor 101 through frontside bus 204.

In one embodiment of the present invention, northbridge 200 is coupled to southbridge 201 through bus 206. In one embodiment, southbridge 201 is coupled to storage device 103 through bus 207. In one embodiment of the present invention, bus 207 can include an Advanced Technology Attachment (ATA) bus. In one embodiment, southbridge 201 can be coupled to one or more devices. For example, southbridge 201 can be coupled to device 202 through bus 208. In one embodiment of the present invention, bus 208 can include a Peripheral Component Interconnect (PCI) bus. In this embodiment, one or more devices are coupled to southbridge 201 through bus 208. In another embodiment, bus 208 is one of a set of PCI Express busses. In this embodiment, each device coupled to southbridge 201 is coupled through its own PCI Express bus.

Switching Between Internal and External Video Sources

Figure 3:
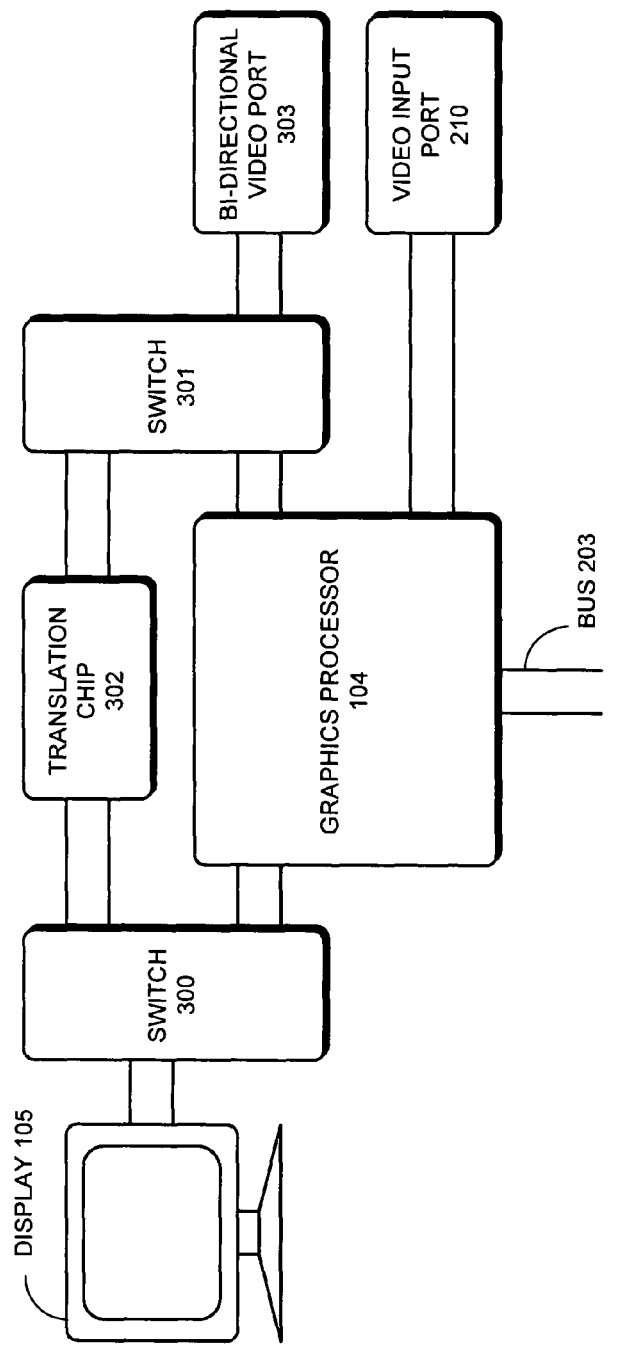
FIG. 3 presents a block diagram illustrating two switches which can be used to select between an internal video source and an external video source for an all-in-one computer system in accordance with an embodiment of the present invention.

FIG. 3 presents a block diagram illustrating switches 300-301 which can be used to select between an internal video source and an external video source for all-in-one computer system 100 in accordance with an embodiment of the present invention.

In one embodiment of the present invention, switch 301 is coupled to graphics processor 104 and bi-directional video port 303.

In one embodiment of the present invention, switch 301 is also coupled to translation chip 302. In another embodiment of the present invention, switch 301 is coupled to switch 300 (i.e., a translation chip is either not present, or is being bypassed).

In one embodiment of the present invention, translation chip 302 converts external video signals so that they can be displayed on display 105.

In one embodiment of the present invention, switch 301 couples bi-directional video port 303 to display 105. This embodiment couples signals from an external video source to display 105. In another embodiment, switch 301 couples bi-directional video port 303 to translation chip 302. In another embodiment, switch 301 couples bi-directional video port 303 to switch 300. In another embodiment, switch 301 couples an internal video signal generated by graphics processor 104 to bi-direction video port 303. This embodiment outputs video signals generated by graphics processor 104 to an external monitor. Note that as illustrated in FIG. 3, a signal from bidirectional video port 303 is coupled through translation chip 302 and switch 300 prior to reaching display 105. However, translation chip 302 may not be present in some embodiments and switch 301 is coupled to switch 300.

In one embodiment of the present invention, switch 300 is coupled to graphics processor 104 and display 105.

In one embodiment of the present invention, switch 300 is also coupled to translation chip 302. In another embodiment, switch 300 is coupled to switch 301.

In one embodiment of the present invention, switch 300 couples bi-directional video port 303 to display 105. In this way, this embodiment couples video signals from an external video source to display 105. In another embodiment, switch 300 couples switch 301 to display 105. In another embodiment, switch 300 couples translator chip 302 to display 105. In another embodiment, switch 300 couples an internal video signal generated by graphics processor 104 to display 105.

In one embodiment of the present invention, if a user requests to display the external video source on display 105, switches 300-301 are configured to direct video signals generated by an external video source to display 105.

In one embodiment of the present invention, if a user requests that an internal video signal be output to bi-directional video port 303, switch 301 is configured to direct internal video signals generated by graphics processor 104 to bi-directional video port 303.

In one embodiment of the present invention, video input port 210 provides a second input for an external video source. Note that one or more video input ports can be used. In another embodiment of the present invention, video input port 210 is removed from the system and only bi-directional video port 303 is used to receive video signals from an external video source.

Figure 4:
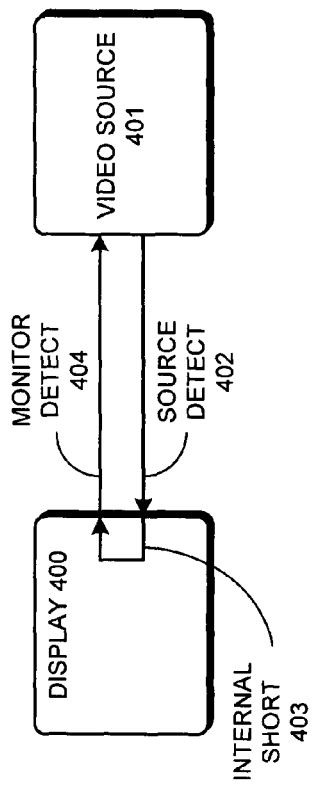
FIG. 4 presents a block diagram illustrating a system that supports a monitor-detect signal and a source-detect signal in accordance with an embodiment of the present invention.

Some displays include a mechanism (e.g., a video source indicator pin) to detect whether a valid video source is coupled to the display and also include a mechanism to indicate whether a valid display is coupled to a video source (e.g., monitor-detect signal). For example, a power supply pin for a Digital Data Channel (DDC) interface can be used to detect whether a valid video source is coupled to the DVI display. More specifically, FIG. 4 presents a block diagram illustrating a system that supports a monitor-detect signal and a source-detect signal in accordance with an embodiment of the present invention. In this system, video source 401 generates source-detect signal 402 which is received by display 400. Note that display 400 uses source-detect signal 402 to determine whether video source 401 is coupled to the display and valid. Display 400 contains an internal short 403 which shorts source-detect signal 402 to monitor-detect signal 404. Video source 401 uses monitor-detect signal 404 to determine whether display 105 is coupled to video source 401.

In one embodiment of the present invention, source-detect signal 402 is asserted on a video source indicator pin. More specifically, in one embodiment, source-detect signal 402 is a power supply pin for a DDC interface. In one embodiment of the present invention, monitor-detect 404 is a power supply pin for a DDC interface. Note that for display interfaces that do not use a DDC interface, any pin which can be used to detect the presence of a video source can be used instead.

In one embodiment of the present invention, bi-directional video port 303 has a single video source indicator pin. As a result, both the internal video source and the external video source assert a signal on the same video source indicator pin. Thus, to determine whether an external video source is coupled to display 105, one embodiment of the present invention first deasserts a source-detect signal generated by an internal video source that is applied to the video source indicator pin of bi-directional video port 303. Next, the video source indicator pin is observed to determine whether a signal exists on the pin. If so, an external video source is coupled to the display. Note that the bi-directional video port includes a video source indicator pin which is coupled to the appropriate pins on switches 300-301 and display 105.

Figure 5:
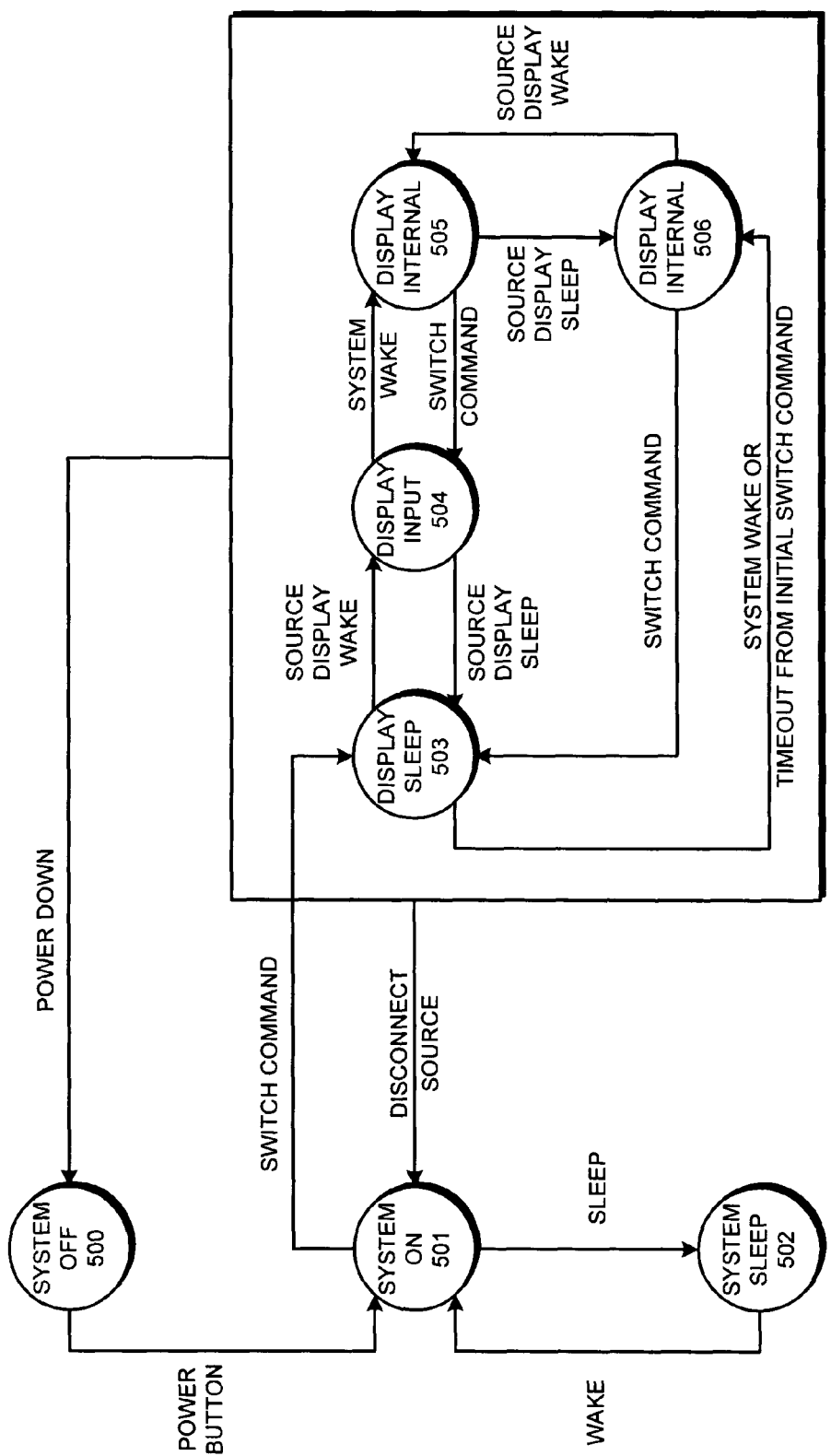
FIG. 5 presents an exemplary state diagram for an all-in-one computer system which can switch between displaying an internal video source and an external video source in accordance with an embodiment of the present invention.

FIG. 5 presents an exemplary state diagram for an all-in-one computer system which can switch between displaying an internal video source and an external video source in accordance with an embodiment of the present invention. In state 500, the computer system is powered-down. Pressing the power button for the computer system turns the system on (state 501).

In one embodiment of the present invention, when the system is in state 501, a video signal generated from an internal video source is displayed on the display of the all-in-one computer system computer system. In one embodiment of the present invention, if the system goes into a sleep mode, the system enters state 502, wherein the display is not turned on. If a switch command is received while the system is in state 501, the system moves into a state 503, wherein the system is running, the external video source is coupled to the display but is invalid, and the system is configured to display the external video signal. In state 503, the external source is not driving the display.

In one embodiment of the present invention, if the system is in state 502 and a system wake event is received, the system enters state 501.

In one embodiment, if the system is in state 503 and a source display wake event is encountered, the system moves into state 504, wherein the system is running, and the external video source is displayed on the display. In another embodiment, if the system is in state 503 and a system wake event or a timeout from the initial switch command is encountered, the system moves into state 506, wherein the system is running, an invalid external video source is coupled to the system, and the internal video source is displayed on the display. Note that a timeout can occur if an external video source is coupled to the bidirectional video port, but the video signal generated by the external video source is not valid.

In one embodiment, if the system is in state 504 and the external video source goes into a source display sleep mode, the system enters state 503. In another embodiment of the present invention, if the system is in state 504 and a system wake event is encountered, the system moves into state 505, wherein the system is running, an external video source is coupled to the system, and the internal video source is displayed on the display.

In one embodiment, if the system is in state 505 and the external video source enters a display sleep mode, the system enters state 506. In another embodiment, if the system is in state 505 and a switch command is received, the system enters state 504.

In one embodiment, if the system is in state 506 and a source display wake event is encountered, the system enters state 505. In another embodiment, if the system is in state 506 and a switch command is received, the system enters state 503.

In one embodiment, if the system is in states 503-506 and the external video source is uncoupled from the system, the system moves into state 501. In another embodiment, if the system is in states 503-506 and the system is powered-down, the system enters state 500.

Figure 6:
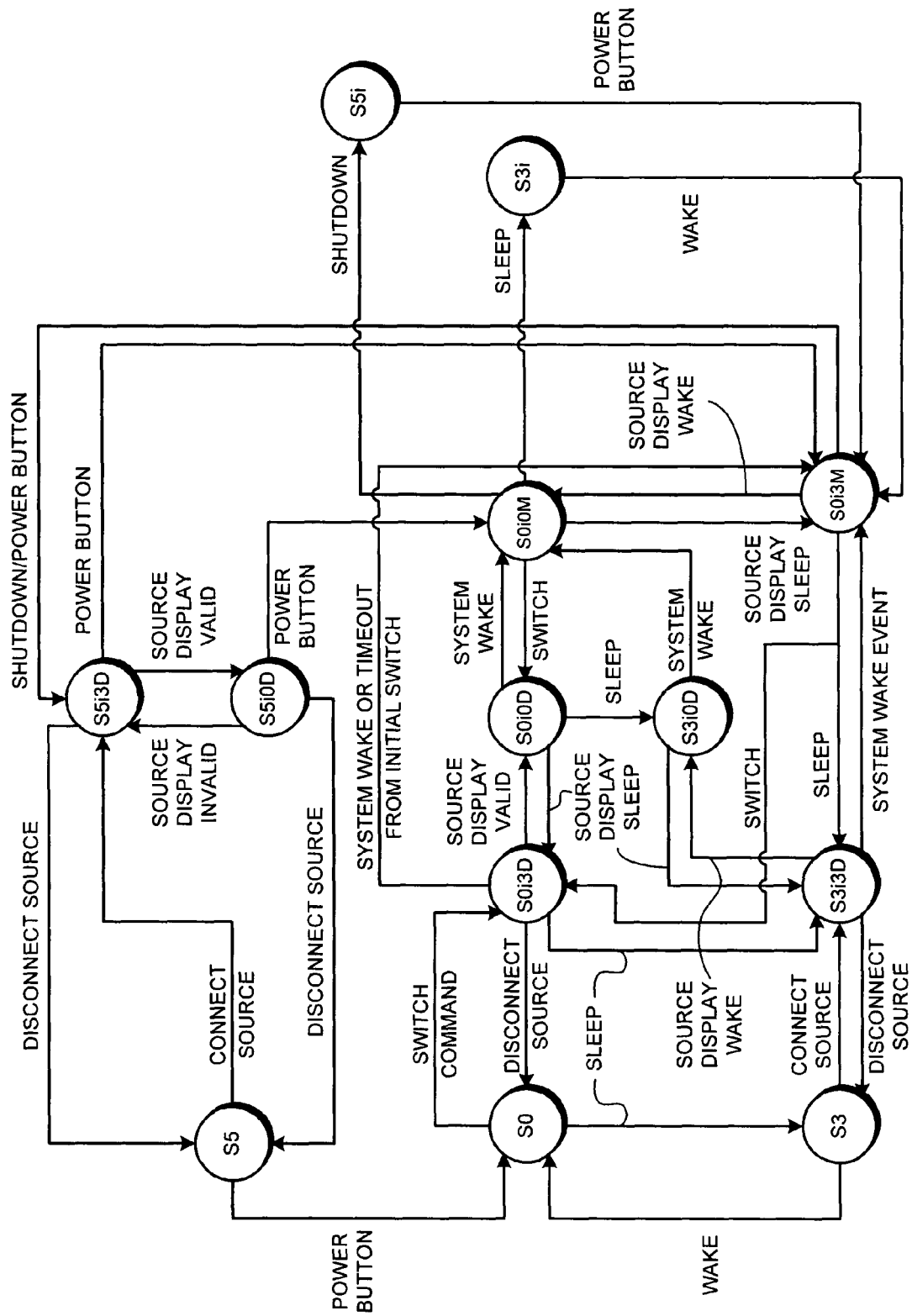
FIG. 6 presents another exemplary state diagram for a computer system which can switch between displaying an internal video source and an external video source in accordance with an embodiment of the present invention.

FIG. 6 presents another exemplary state diagram for a computer system which can switch between displaying an internal video source and an external video source in accordance with an embodiment of the present invention. Note that the each state in FIG. 6 includes a descriptor of the form SXiYD (or SXiYM). "SX" refers to the system state, wherein the "X" can be either 0, 3, or 5. In state S0, the system is on and running. In state S3, the system is in a sleep or standby mode. In state S5, the system is powered-down. "iX" refers to the state of the external video source. In state i0, the external video source is powered-on, running, and valid. In state i3, the external video source is in a sleep mode or is invalid. In state i5, the external video source is not present (e.g., mechanically unplugged from the computer system). "D" and "M" indicate that the external video source and the internal video source, respectively, are active. Also note that the state diagram illustrated in FIG. 6 is only one exemplary implementation of the present invention and is not meant to limit the scope of the present invention to the illustrated state diagram.

In state S5, the system is powered-off and the system is configured to display the internal video source. In one embodiment, if the system is in state S5 and a source is coupled to the system, the system enters state S5i3D, wherein system is powered-off, an external video source is coupled to the system but is not valid, and the system is configured to display the external video source. In another embodiment, if the system is in state S5 and the power button for the system is pressed, the system enters state S0, wherein the system is powered on and the internal video source is driving the display.

In one embodiment, if the system is in state S5i3D and the external video source is uncoupled from the system, the system enters state S5. In another embodiment, if the system is in state S5i3D and the external video source is valid, the system enters state S5i0D, wherein the system is powered-off, an external video source is coupled to the system and is valid, and the system is configured to display the external video source. Note that in state S5i0D, the external video source is driving the display. In another embodiment, if the system is in state S5i3D and the power button for the system is pressed (i.e., turning on the system), the system enters state S0i3M, wherein the system is powered-on, an external video source is coupled to the system and is invalid, and the system is configured to display the internal video source. In state S0i3M, the internal video source is driving the display.

In one embodiment, if the system is in state S5i0D and the external video source is invalid, the system enters state S5i3D. In another embodiment, if the system is in state S5i0D and the external video source is uncoupled from the system, the system enters state S5. In another embodiment, if the system is in state S5i0D and the power button for the system is pressed (i.e., turn on system), the system enters state S0i0M, wherein the system is powered-on, an external video source is coupled to the system and is valid, and the system is configured to display the internal video source. In state S0i0M, the internal video source is driving the display.

In one embodiment, if the system is in state S0, an external video source is coupled to the system, and a switch command is received, the system enters state S0i3D, wherein the system is powered-on, an external video source is coupled to the system but is not valid, and the system is configured to display the external video source. In state S0i3D, the external video source is not yet driving the display. In another embodiment, if the system is in state S0 and a sleep event is encountered, the system enters state S3, wherein the system enters a sleep mode.

In one embodiment, if the system is in state S3 and a system wake event is encountered, the system enters state S0. In another embodiment, if the system is in state S3 and an external video source is coupled to the system, the system enters state S3i3D, wherein the system is in a sleep mode, an external video source is coupled to the system but is not valid, and the system is configured to display the external video source on the display. In state S3i3D, the external video source is not yet driving the display.

In one embodiment, if the system is in state S0i3D and the external video source is uncoupled from the system, the system enters state S0. In another embodiment, if the system is in state S0i3D and the external video source is valid, the system enters state S0i0D, wherein the system is powered-on, an external video source is coupled to the system and is valid, and the system is configured to display the external video source. In state S0i0D, the external video source is driving the display. In another embodiment, if the system is in state S0i3D and a system sleep event is encountered, the system enters state S3i3D. In another embodiment, if the system is in state S0i3D and a system wake event or a timeout from an initial switch command is encountered, the system enters state S0i3M.

In one embodiment, if the system is in state S0i0D and the external video source enters a display sleep mode, the system enters state S0i3D. In another embodiment, if the system is in state S0i0D and a system sleep event is event is encountered, the system enters state S3i0D, wherein the system is in a sleep mode, an external video source is coupled to the system and is valid, and the system is configured to display the external video source. In state S3i0D, the external video source is driving the display. In another embodiment, if the system is in state S0i0D and a system wake event is encountered, the system enters state S0i0M.

In one embodiment, if the system is in state S3i0D and a system wake event is encountered, the system enters state S0i0M. In another embodiment, if the system is in state S3i0D and the external video source enters a display sleep mode, the system enters state S3i3D.

In one embodiment, if the system is in state S3i3D and the external video source is uncoupled from the system the system enters state S3. In another embodiment, if the system is in state S3i3D and the external video source wakes form a sleep mode, the system enters state S3i0D. In one embodiment, if the system is in state S3i3D and a system wake event is encountered, the system enters state S0i3M.

In one embodiment, if the system is in state S0i0M and a switch command is encountered, the system enters state S0i0D. In another embodiment, if the system is in state S0i0M and the external video source enters a display sleep mode, the system enters state S0i3M. In another embodiment, if the system is in state S0i0M and the system encounters a sleep event, the system enters state S3i, wherein the system enters a sleep mode, an external video source is coupled to the system and is valid, and the system is configured to display the internal video source. In another embodiment, if the system is in state S0i0M and the system is powered down, the system enters state S5i, wherein the system is shut down, an external video source is coupled to the system and is valid, and the system is configured to display the internal video source.

In one embodiment, if the system is in state S0i3M and a system sleep event is encountered, the system enters state S3i3D. In another embodiment, if the system is in state S0i3M and the external video source wakes from a display sleep state, the system enters state S0i0M. In another embodiment, if the system is in state S0i3M and the system is powered-down, the system enters state S5i3D. In another embodiment of the present invention, if the system is in state S0i3M and a switch command is received, the system enters state S0i3D.

In one embodiment, if the system is in state S3i and a system wake event is encountered, the system enters state S0i3M.

In on embodiment, if the system is in state S5i and the power button is pressed (turning on system), the system enters state S0i3M.

In one embodiment of the present invention, a system wake event can include, but is not limited to: a mouse event (e.g., mouse is moved, mouse button clicked, a keyboard event (e.g., keyboard button is pressed), and the power button being pressed. In one embodiment of the present invention, a sleep event can include, but is not limited to: exceeding a specified amount of time without encountering a specified event. For example, a source sleep event can occur when the source does not detect a display within a specified amount of time. Similarly, a system sleep event can occur when the system does not detect a keyboard or mouse event within a specified amount of time. In one embodiment, a source wake event can include, but is not limited to, detecting the presence of a display.

Figure 7:
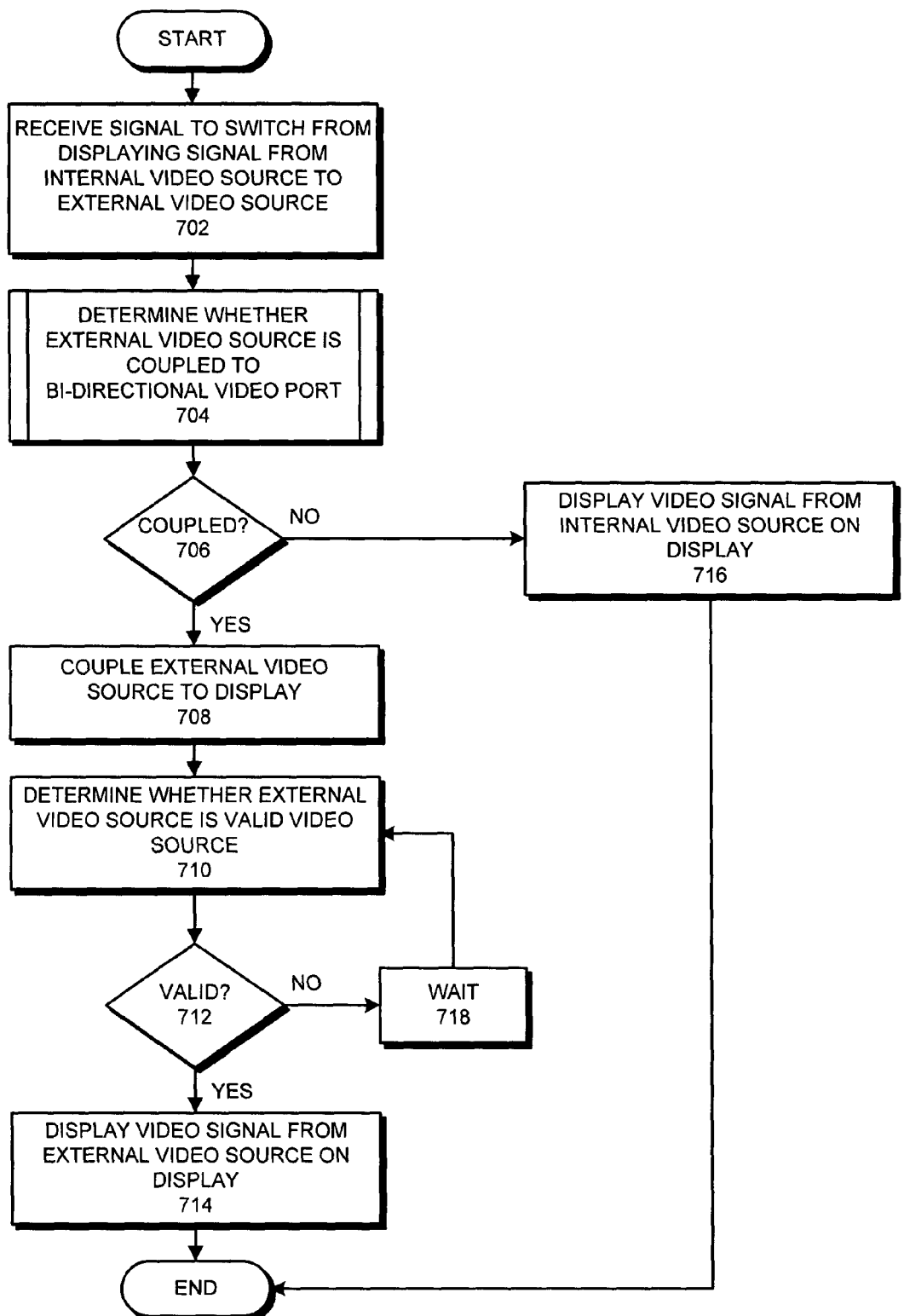
FIG. 7 presents a flow chart illustrating the process of switching from displaying an internal video source to displaying an external video source in accordance with an embodiment of the present invention.

FIG. 7 presents a flow chart illustrating the process of switching from displaying an internal video source to displaying an external video source in accordance with an embodiment of the present invention. The process begins when the system receives a signal to switch from displaying a video signal from an internal video source to displaying a video signal from an external video source, wherein the internal video source and the external video source are coupled to a bi-directional video port for the computer system, wherein the internal video source generates an output video signal for the bi-directional port, and wherein the external video source generates an input video signal for the bi-directional port (step 702). In one embodiment of the present invention, the video source indicator pin is a power supply pin for a DDC interface. In one embodiment, the signal to switch from displaying the internal video source on the display to displaying the external video source on the display can include: a switch signal toggled from a button on the computer system; or a switch signal activated from a user interface of the computer system. In one embodiment of the present invention, the bi-directional video port can include, but is not limited to: a DVI port; a mini-DVI port; a universal display interface (UDI) port; a video graphics array (VGA) port, a mini-VGA port; a digital flat panel (DFP) port; a DisplayPort port; a High-Definition Multimedia Interface (HDMI) port; and other video ports now known or later developed.

Next, the system determines whether the external video source is coupled to the bi-directional video port (step 704). Note that step 704 is described in more detail with reference to FIG. 8.

If the external video source is coupled to the bi-directional video port (step 706, yes), the system couples the external video source to the display (step 708). The system then determines whether the external video source is a valid video source (step 710). If so (step 712, yes), the system displays the video signal from the external video source on the display (step 714). Otherwise (step 712, no), the system waits for a specified amount of time (step 718) and returns to step 710. In one embodiment of the present invention, prior to displaying the external video source on the display, the system scales a video signal generated by the external video source so that the video signal can be displayed on the display.

In one embodiment of the present invention, an invalid external video source can include: an external video source which is not coupled to the bidirectional video port; an external video source which is in a display-sleep mode; an external video source which is powered-down; and an external video source which uses a protocol that is not supported by the display.

If the system determines that the external video source is not coupled to the bi-directional video port (step 706, no), the system continues to display a video signal generated by the internal video source (step 716).

Figure 8:
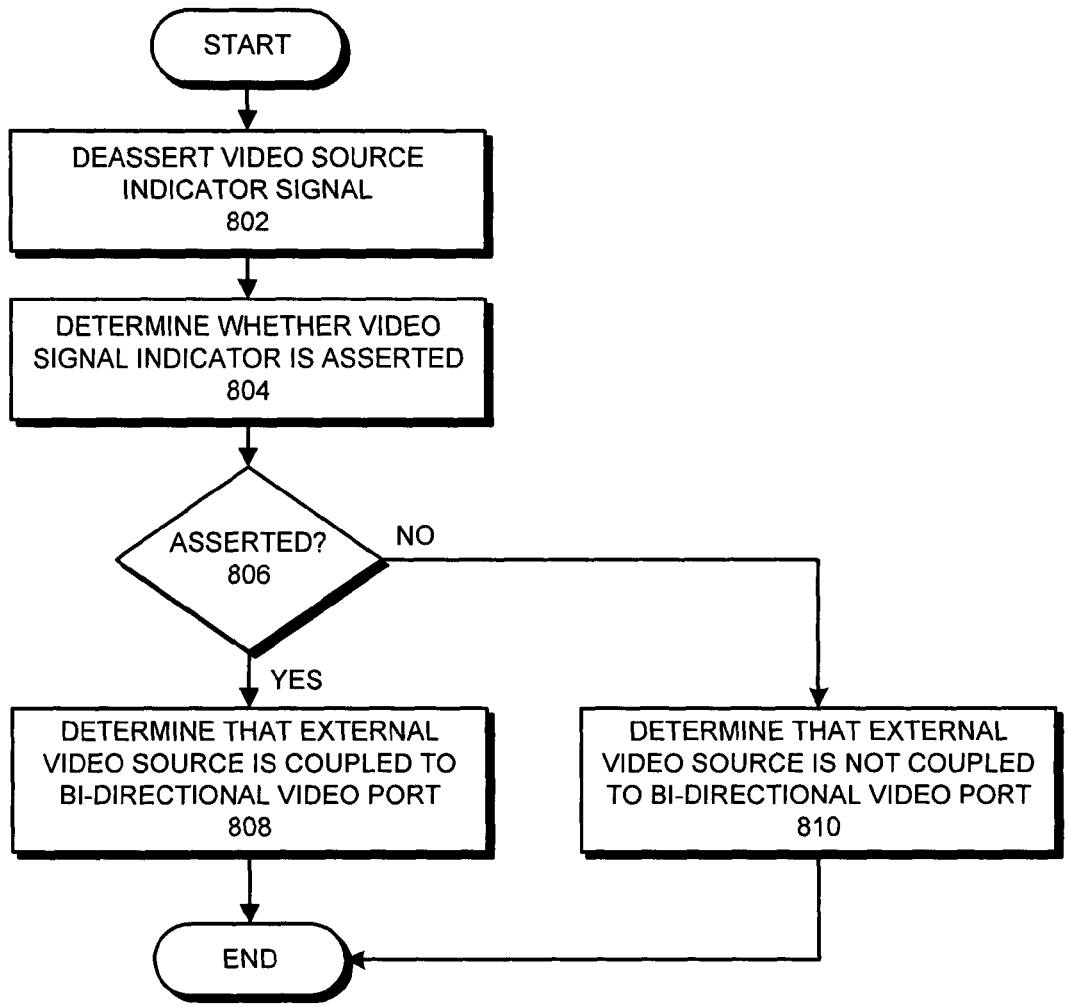
FIG. 8 presents a flow chart illustrating the process of determining whether an external video source is coupled to a bi-directional video port of the computer system in accordance with an embodiment of the present invention.

FIG. 8 presents a flow chart illustrating the process of determining whether an external video source is coupled to a bi-directional video port of the computer system in accordance with an embodiment of the present invention. The process begins when the system deasserts a video source indicator signal asserted by the internal video source on a video source indicator pin of the bi-directional video port, wherein the video source indicator signal for the internal video source and the video source indicator signal for the external video source are asserted on the same video source indicator pin of the bi-directional video port (step 802). Next, the system determines whether the video signal indicator signal is asserted on the video source indicator pin of the bi-directional video port (step 804). If so (step 806), the system determines that the external video source is coupled to the bi-directional video port (step 808). Otherwise (step 804, no), the system determines that the external video source is not coupled to the bi-directional video port (step 810).

Figure 9:
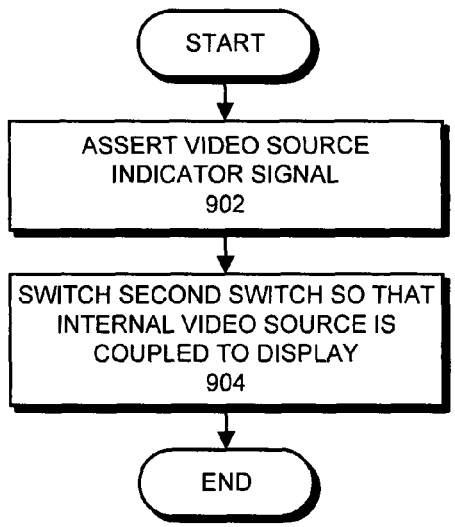
FIG. 9 presents a flow chart illustrating the process of switching from displaying an external video source to displaying an internal video source in accordance with an embodiment of the present invention.

FIG. 9 presents a flow chart illustrating the process of switching from displaying an external video source to displaying an internal video source in accordance with an embodiment of the present invention. The process begins when the system receives a signal to switch from display the external video source on the display to displaying the internal video source on the display (step 902). In one embodiment of the present invention, the signal to switch from displaying the external video source on the display to displaying the internal video source on the display can include: a system wake event for the computer system; a switch signal toggled from a button on the computer system; and a switch signal activated from a user interface of the computer system.

Next, the system asserts the video source indicator signal asserted by the internal video source on the video source indicator pin of the bi-directional video port (step 902). The system then switches the second switch (e.g., switch 300 in FIG. 3) so that the internal video source is coupled to the display (step 904).

Figure 10:
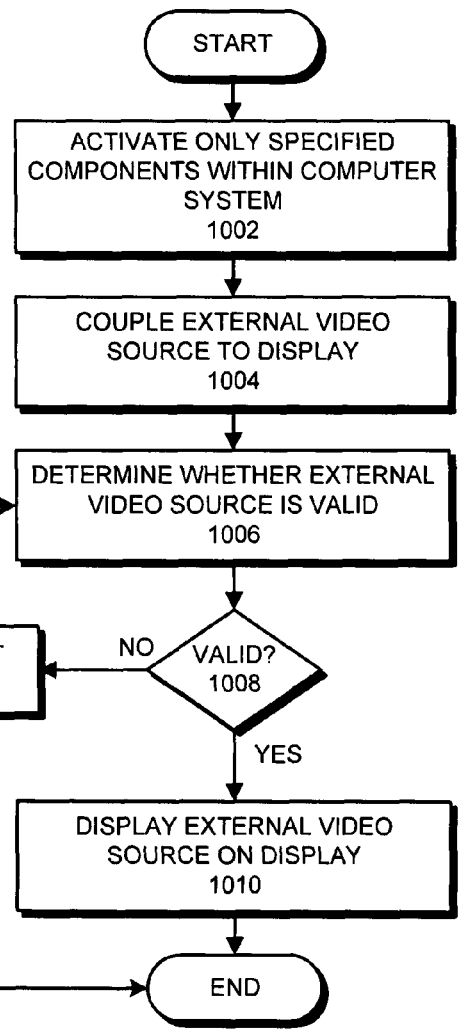
FIG. 10 presents a flow chart illustrating the process of switching from displaying an internal video source to displaying an external video source when the all-in-one computer system is powered-off in accordance with an embodiment of the present invention.

FIG. 10 presents a flow chart illustrating the process of switching from displaying an internal video source to displaying an external video source when the all-in-one computer system is powered-off in accordance with an embodiment of the present invention. The process begins when the system activates only specified components within the computer system which are used to display the external video source, wherein other components within the computer system remain turned off (step 1002). In one embodiment of the present invention, the specified components can include: the display; control circuits and processing circuits for displaying the external video source on the display; cooling fans to cool the display; one or more power supplies; and cooling fans to cool the control circuits and the processing circuits.

Next, the system couples the external video source to the display (step 1004). The system then determines whether the external video source is a valid video source (step 1006). If so (step 1008, yes), the system displays the external video source on the display (step 1010). Otherwise, the system waits for a specified amount of time (step 1012) and determines whether a timeout has exceeded (step 1014). If a timeout has been exceeded, the system powers-down the computer system (step 1016). Otherwise, the system returns to step 1006. Note that steps 1012 and 1014 can be performed in any order.

Tables 1-9 present a number of settings for an all-in-one computer system. Note that these tables illustrate one of a number of possible embodiments of the present invention. Hence, the tables below are not meant to limit the scope of the present invention.

Table 1 presents a number of settings for an all-in-one computer system which is in state S5 in accordance with an embodiment of the present invention. In state S5, the system is powered-off and the system is configured to display the internal video source.

TABLE 1

| S5 | |
|---|---|
| Source Indicator Pin Asserted by External Source? | No |
| Valid signal input | N/A |
| Source Indicator Pin Asserted by Internal Source? | Off |
| Cooling system | Off |
| Panel power | Off |
| Backlight | Off |
| Switch enable | Disabled |
| Switch 301 | Output |
| Switch 300 | Internal |
| LED | Off |
| Fan control | Off |

Table 2 presents a number of settings for an all-in-one computer system which is in state S5i3D in accordance with an embodiment of the present invention. In state S5i3D, the system is powered-off, an external video source is coupled to the system but is not valid, and the system is configured to display the external video source. In this embodiment, since the external video source is not valid, the external video source is not yet driving the display. Note that an invalid video source can result from the video source being an incorrect format or the video source not generating a video signal.

TABLE 2

| S5i3D | |
|---|---|
| Source Indicator Pin Asserted by External Source? | Yes |
| Valid signal input | No |
| Source Indicator Pin Asserted by Internal Source? | Off |
| Cooling system | Off |
| Panel power | Off |
| Backlight | Off |
| Switch enable | Disabled |
| Switch 301 | Input |
| Switch 300 | External |
| LED | On |
| Fan control | Off |

Table 3 presents a number of settings for an all-in-one computer system which is in state S5i0D in accordance with an embodiment of the present invention. In state S5i0D, the system is powered-off, an external video source is coupled to the system and is valid, and the system is configured to display the external video source. In this state, the external video source is driving the display.

Table 4 presents a number of settings for an all-in-one computer system which is in state S0 in accordance with an embodiment of the present invention. In state S0, the system is powered on and the internal video source is driving the display.

TABLE 3

| S5i0D | |
|---|---|
| Source Indicator Pin Asserted by External Source? | Yes |
| Valid signal input | Yes |
| Source Indicator Pin Asserted by Internal Source? | Off |
| Cooling system | On |
| Panel power | On |
| Backlight | On |
| Switch enable | Enabled |
| Switch 301 | Input |
| Switch 300 | External |

TABLE 3-continued

| S5i0D | |
|---|---|
| LED | Off |
| Fan control | Forced |

TABLE 4

| S0 | |
|---|---|
| Source Indicator Pin Asserted by External Source? | No |
| Valid signal input | No |
| Source Indicator Pin Asserted by Internal Source? | On |
| Cooling system | On |
| Panel power | On |
| Backlight | On |
| Switch enable | Enabled |
| Switch 301 | Output |
| Switch 300 | Internal |
| LED | Off |
| Fan control | PID |

Table 5 presents a number of settings for an all-in-one computer system which is in state S0i3D in accordance with an embodiment of the present invention. In state S0i3D, the system is powered-on, an external video source is coupled to the system but is not valid, and the system is configured to display the external video source. In this state, the external video source is not yet driving the display.

Table 6 presents a number of settings for an all-in-one computer system which is in state S0i0D in accordance with an embodiment of the present invention. In state S0i0D, the system is powered-on, an external video source is coupled to the system and is valid, and the system is configured to display the external video source. In this state, the external video source is driving the display.

TABLE 5

| S0i3D | |
|---|---|
| Source Indicator Pin Asserted by External Source? | Yes |
| Valid signal input | No |
| Source Indicator Pin Asserted by Internal Source? | Off |
| Cooling system | On |
| Panel power | Off |
| Backlight | Off |
| Switch enable | Disabled |
| Switch 301 | Input |
| Switch 300 | External |
| LED | On |
| Fan control | PID |

TABLE 6

| S0i0D | |
|---|---|
| Source Indicator Pin Asserted by External Source? | Yes |
| Valid signal input | Yes |
| Source Indicator Pin Asserted by Internal Source? | Off |
| Cooling system | On |
| Panel power | On |
| Backlight | On |
| Switch enable | Enabled |
| Switch 301 | Input |
| Switch 300 | External |
| LED | Off |
| Fan control | PID |

Table 7 presents a number of settings for an all-in-one computer system which is in state S0i0M in accordance with an embodiment of the present invention. In state S0i0M, the system is powered-on, an external video source is coupled to the system and is valid, and the system is configured to display the internal video source. In this state, the internal video source is driving the display.

Table 8 presents a number of settings for an all-in-one computer system which is in state S3i3D in accordance with an embodiment of the present invention. In state S3i3D, the system is in a sleep mode, an external video source is coupled to the system but is not valid, and the system is configured to display the external video source on the display. In this state, the external video source is not yet driving the display.

TABLE 7

S0i0M

| | |
|---|---|
| Source Indicator Pin Asserted by External Source? | Yes |
| Valid signal input | Yes |
| Source Indicator Pin Asserted by Internal Source? | Off |
| Cooling system | On |
| Panel power | On |
| Backlight | On |
| Switch enable | Enabled |
| Switch 301 | Input |
| Switch 300 | Internal |
| LED | Off |
| Fan control | PID |

TABLE 8

S3i3D

| | |
|---|---|
| Source Indicator Pin Asserted by External Source? | Yes |
| Valid signal input | No |
| Source Indicator Pin Asserted by Internal Source? | Off |
| Cooling system | Off |
| Panel power | Off |
| Backlight | Off |
| Switch enable | Disabled |
| Switch 301 | Input |
| Switch 300 | External |
| LED | On |
| Fan control | Off |

Table 9 presents a number of settings for an all-in-one computer system which is in state S3i0D in accordance with an embodiment of the present invention. In state S3i0D, the system is in a sleep mode, an external video source is coupled to the system and is valid, and the system is configured to display the external video source. In the state, the external video source is driving the display.

TABLE 9

S3i0D

| | |
|---|---|
| Source Indicator Pin Asserted by External Source? | Yes |
| Valid signal input | Yes |
| Source Indicator Pin Asserted by Internal Source? | Off |
| Cooling system | On |
| Panel power | On |
| Backlight | On |
| Switch enable | Enabled |
| Switch 301 | Input |
| Switch 300 | External |
| LED | Off |
| Fan control | Forced |

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for displaying a video signal on a display of a first computer system, comprising:
 receiving a signal to switch from displaying a video signal from an internal video source of the first computer system to displaying a video signal from an external video source of a second computer system, wherein the second computer system is separate from the first computer system, wherein the internal video source of the first computer system and the external video source of the second computer system are coupled to a bi-directional video port of the first computer system, wherein the external video source of the second computer system is configured to generate an input video signal to the bi-directional video port, and wherein the bi-directional video port comprises an external port of the first computer system configured to couple the second computer system to the first computer system;
 determining whether the external video source of the second computer system is coupled to the bi-directional video port based at least in part on whether an indicator signal received on the bi-directional video port is asserted or deasserted;
 coupling the external video source to the display of the first computer system when the external video source is coupled to the bi-directional video port;
 determining whether the external video source is a valid video source;
 displaying the video signal from the external video source on the display of the first computer system when the external video source is valid; and
 when the first computer system is turned off and the external video source of the second computer system is coupled to the bi-directional video port, activating components of the first computer system comprising the display and internal control and processing circuits configured to display the video signal of the external video source of the second computer system on the display, wherein internal components of the first computer system that are not used for displaying the video signal of the external video source of the second computer system on the display remain turned off.

2. The method of claim 1, wherein determining whether the external video source is coupled to the bi-directional video port comprises:
 deasserting a video source indicator signal asserted by the internal video source on a video source indicator pin of the bi-directional video port, wherein the video source indicatory signal for the internal video source and the video source indicatory signal for the external video source are asserted on the same video source indicator pin of the bi-directional video port;
 determining whether the video signal indicator signal is asserted on the video source indicator pin of the bi-directional video port;
 if so, determining that the external video source is coupled to the bi-directional video port; and
 otherwise, determining that the external video source is not coupled to the bi-directional video port.

3. The method of claim 2, wherein the video source indicator pin comprises a power supply pin of a Digital Data Channel (DDC) interface.

4. The method of claim 1, wherein a first switch is configured to couple:
   the internal video source to the bi-directional video port; or
   the external video source of the second computer system, which is coupled to the bi-directional video port, to the display.

5. The method of claim 4, wherein coupling the external video source to the display comprises switching the first switch to couple the external video source to the display.

6. The method of claim 4, wherein a second switch is configured to couple:
   the internal video source to the display; or
   the external video source, which is coupled through the first switch, to the display.

7. The method of claim 6, wherein displaying the external video source on the display comprises switching the second switch to couple the external video source to the display.

8. The method of claim 6, wherein when a signal to switch from displaying the external video source on the display to displaying the internal video source on the display is received, the method further comprises:
   asserting the video source indicator signal for the internal video source on the video source indicator pin of the bi-directional video port; and
   switching the second switch to couple the internal video source to the display.

9. The method of claim 8, wherein the signal to switch from displaying the external video source on the display to displaying the internal video source on the display comprises:
   a system wake event for the first computer system;
   a switch signal toggled via a button on the first computer system;
   a switch signal activated via a user interface of the first computer system;
   or a combination thereof.

10. The method of claim 1, wherein the signal to switch from displaying the internal video source on the display to displaying the external video source on the display comprises:
    a switch signal toggled via a button on the first computer system;
    a switch signal activated via a user interface of the first computer system;
    or a combination thereof.

11. The method of claim 1, wherein the second computer system comprises a computer system including a second display.

12. The method of claim 1, wherein the bi-directional video port comprises:
    a Digital Video Interface (DVI) port;
    a mini-DVI port; a universal display interface (UDI) port;
    a video graphics array (VGA) port, a mini-VGA port;
    a digital flat panel (DFP) port; a DisplayPort port;
    a High-Definition Multimedia Interface (HDMI) port;
    or any combination thereof.

13. The method of claim 1, wherein if the external video source is not coupled to the bi-directional video port, the method further comprises coupling the internal video source to the display.

14. The method of claim 1, wherein if the external video source is not a valid video source, the method further comprises displaying the video signal of the internal video source on the display.

15. The method of claim 14, wherein an invalid external video source comprises:
    an external video source which is not coupled to the bi-directional video port;
    an external video source which is in a display-sleep mode;
    an external video source which is powered-down;
    an external video source which uses a protocol that is not supported by the display;
    or any combination thereof.

16. The method of claim 1, wherein if the first computer system is turned off and the external video source is coupled to the bi-directional video port, the method further comprises:
    coupling the external video source to the display;
    determining whether the external video source is a valid video source; and
    displaying the external video source on the display when the external video source is valid.

17. The method of claim 16, wherein, when the first computer system is turned off and the external video source is coupled to the bi-directional video port, activating internal components in the first computer system further comprises activating:
    cooling fans to cool the display;
    one or more power supplies;
    cooling fans to cool the control circuits and the processing circuits;
    or a combination thereof.

18. The method of claim 1, wherein prior to displaying the external video source on the display, the method further comprises scaling a video signal generated by the external video source to configure the video signal of the external video source to be displayed on the display.

19. The method of claim 1, wherein the bi-directional video port is a video port that includes mechanisms for configuring the bi-directional video port to be used as an output-only video port.

20. The method of claim 1, wherein the second computer system is mechanically plugged into the bi-directional port to couple the external video source of the second computer system to the first computer system.

21. A non-transitory computer-readable storage medium storing instructions that when executed by a computer cause the computer to perform a method for displaying a video signal on a display of a first computer system, wherein the method comprises:
    receiving a signal to switch from displaying a video signal from an internal video source of the first computer system to displaying a video signal from an external video source of a second computer system, wherein the second computer system is separate from the first computer system, wherein the internal video source of the first computer system and the external video source of the second computer system are coupled to a bi-directional video port of the first computer system, wherein the external video source of the second computer system is configured to generate an input video signal to the bi-directional port, and wherein the bi-directional video port comprises an external port of the first computer system configured to couple the second computer system to the first computer system;
    determining whether the external video source of the second computer system is coupled to the bi-directional video port based at least in part on whether an indicator signal received on the bi-directional video port is asserted or deasserted;
    coupling the external video source to the display of the first computer system when the external video source is coupled to the bi-directional video port;
    determining whether the external video source is a valid video source;

displaying the video signal from the external video source on the display of the first computer system when the external video source is valid; and when the first computer system is turned off and the external video source of the second computer system is coupled to the bi-directional video port, activating components of the first computer system comprising the display and internal control and processing circuits configured to display the video signal of the external video source of the second computer system on the display, wherein internal components of the first computer system that are not used for displaying the video signal of the external video source of the second computer system on the display remain turned off.

22. The non-transitory computer-readable storage medium of claim 21, wherein determining whether the external video source of the second computer system is coupled to the bi-directional video port comprises:

deasserting a video source indicator signal asserted by the internal video source on a video source indicator pin of the bi-directional video port, wherein the video source indicatory signal for the internal video source and the video source indicatory signal for the external video source are asserted on the same video source indicator pin of the bi-directional video port;

determining whether the video signal indicator signal is asserted on the video source indicator pin of the bi-directional video port;

if so, determining that the external video source is coupled to the bi-directional video port; and otherwise, determining that the external video source is not coupled to the bi-directional video port.

23. An electronic device comprising:
a first computer system, comprising:
a display;
an internal video source;
a bi-directional video port, wherein the bi-directional video port comprises an external port of the first computer system configured to couple an external video source of a second computer system to the first computer system;
a receiving mechanism configured to receive a signal to switch from displaying a video signal from the internal video source of the first computer system to displaying a video signal from the external video source of the second computer system, wherein the internal video source and the external video source are coupled to the bi-directional video port of the first computer system, and wherein the external video source of the second computer system is configured to generate an input video signal to the bi-directional port;
a control circuit configured to:
determine whether the external video source is coupled to the bi-directional video port based on whether an indicator signal received at the bi-directional video port is asserted or deasserted; and to
determine whether the external video source is a valid video source;
a first switch, wherein when the control circuit determines that the external video source is coupled to the bi-directional video port, the first switch is configured to couple the external video source to a second switch; and
the second switch, wherein when the control circuit determines that the external video source is a valid video source, the second switch is configured to coupled the video signal of the external video source of the second computer system to the display;

wherein when the first computer system is turned off and the external video source of the second computer system is coupled to the bi-directional video port, the control circuit is configured to activate components of the first computer system comprising the display and internal processing circuits configured to display the external video source of the second computer system on the display, wherein internal components of the first computer system that are not used to display the video signal of the external video source of the second computer system on the display remain turned off.

24. The electronic device of claim 23, wherein while determining whether the external video source is coupled to the bi-directional video port, the control circuit is configured to:

deassert a video source indicator signal asserted by the internal video source on a video source indicator pin of the bi-directional video port, wherein the video source indicator signal for the internal video source and the video source indicator signal for the external video source are asserted on the same video source indicator pin of the bi-directional video port;

if so, to determine that the external video source is coupled to the bi-directional video port; and otherwise, to determine that the external video source is not coupled to the bi-directional video port.

25. The electronic device of claim 24, wherein the video source indicator pin comprises a power supply pin for a Digital Data Channel (DDC) interface.

26. The electronic device of claim 23, wherein when a signal to switch from displaying the external video source on the display to displaying the internal video source on the display is received:

the control circuit is configured to assert the video source indicator signal for the internal video source on the video source indicator pin of the bi-directional video port; and the second switch is configured to couple the internal video source to the display.

27. The electronic device of claim 26, wherein the signal to switch from displaying the external video source on the display to displaying the internal video source on the display comprises:

a system wake event for the first computer system;
a switch signal toggled via a button on the first computer system;
a switch signal activated via a user interface of the first computer system;
or a combination thereof.

28. The electronic device of claim 23, wherein the signal to switch from displaying the internal video source on the display to displaying the external video source on the display comprises:

a switch signal toggled via a button on the first computer system;
a switch signal activated via a user interface of the first computer system;
or a combination thereof.

29. The electronic device of claim 22, wherein the computer system comprises an "all in one" computer system which includes an integrated display.

30. The electronic device of claim 23, wherein the bi-directional video port comprises:
a Digital Video Interface (DVI) port;
a mini-DVI port; a universal display interface (UDI) port;
a video graphics array (VGA) port, a mini-VGA port;

a digital flat panel (DFP) port; a DisplayPort port;
a High-Definition Multimedia Interface (HDMI) port;
or any combination thereof.

31. The electronic device of claim 23, wherein if the external video source is not coupled to the bi-directional video port, the first switch is configured to couple the internal video source to the bi-directional port.

32. The electronic device of claim 23, wherein if the external video source is not a valid video source, the second switch is configured to couple the internal video source to the display.

33. The electronic device of claim 32, wherein an invalid external video source comprises:
an external video source which is not coupled to the bi-directional video port;
an external video source which is in a display-sleep mode;
an external video source which is powered-down;
an external video source which uses a protocol that is not supported by the display;
or any combination thereof.

34. The electronic device of claim 23, wherein, when the first computer system is turned off and the external video source of the second computer system is coupled to the bi-directional video port, when activating internal components in the first computer system, the control circuit is further configured to activate:
the first switch;
the second switch;
one or more power supplies;
cooling fans to cool the display, the control circuit, the first switch, and the second switch;
or any combination thereof.

35. The electronic device of claim 23, further comprising a scaling circuit configured to scale the video signal of the external video source to configure the video signal to be displayed on the display.

36. The electronic device of claim 23, wherein the bi-directional video port comprises a video port that is typically used as an output-only video port.

* * * * *